United States Patent
Hollands (10) Patent No.: US 10,534,582 B2
(45) Date of Patent: *Jan. 14, 2020

(54) APPLICATION DEPLOYMENT ON A HOST PLATFORM BASED ON TEXT TAGS DESCRIPTIVE OF APPLICATION REQUIREMENTS

(71) Applicant: International Business Machines Corporation, Armonk, NY (US)

(72) Inventor: Mark J. Hollands, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,490

(22) Filed: Nov. 1, 2017

(65) Prior Publication Data

US 2018/0357045 A1    Dec. 13, 2018

Related U.S. Application Data

(63) Continuation of application No. 15/621,377, filed on Jun. 13, 2017.

(51) Int. Cl.
G06F 9/46 (2006.01)
G06F 8/10 (2018.01)
G06F 8/61 (2018.01)

(52) U.S. Cl.
CPC . *G06F 8/10* (2013.01); *G06F 8/61* (2013.01)

(58) Field of Classification Search
CPC .................................................. G06F 8/30–78
See application file for complete search history.

(56) References Cited

U.S. PATENT DOCUMENTS

| | | | |
|---|---|---|---|
| 8,448,164 B2* | 5/2013 | Greiner | G06F 8/61 717/174 |
| 8,997,088 B2 | 3/2015 | Gurikar et al. | |
| 9,063,746 B2 | 6/2015 | Yousouf et al. | |
| 9,110,770 B1* | 8/2015 | Raju | G06F 8/77 |

(Continued)

FOREIGN PATENT DOCUMENTS

| | | |
|---|---|---|
| CN | 105700877 A | 6/2016 |
| CN | 105975340 A | 9/2016 |
| CN | 106534362 A | 3/2017 |

OTHER PUBLICATIONS

"Deployment Automation" XebiaLabs. WayBack Machine Feb. 2, 2017. <http://web.archive.org/web/20170202213747/https://xebialabs.com/solutions/deployment-automation/>.

(Continued)

*Primary Examiner* — Bing Zhao
(74) *Attorney, Agent, or Firm* — Edward P. Li (57) ABSTRACT

A computer program product and a computer system for deploying an application in a distributed processing environment. A computer analyzes an application so as to determine one or more requirements for executing the application. The computer generates an application profile based on the one or more requirements, wherein the application profile is a representative of the one or more requirements for a platform of the distributed processing environment to host the application. The computer controls deployment of the application on the platform of the distributed processing environment based on the application profile.

14 Claims, 5 Drawing Sheets

(56) References Cited

U.S. PATENT DOCUMENTS

| | | | |
|---|---|---|---|
| 9,274,784 B2 | 3/2016 | Wang et al. | |
| 9,274,811 B1 | 3/2016 | Reeves et al. | |
| 9,825,881 B2* | 11/2017 | Johnston | H04L 47/827 |
| 9,858,060 B2* | 1/2018 | Barros | G06F 8/61 |
| 9,946,526 B2* | 4/2018 | Fernandez-Ruiz | G06F 9/45529 |
| 9,983,775 B2* | 5/2018 | Jain | G06F 3/0482 |
| 2010/0042986 A1* | 2/2010 | Greiner | G06F 8/61 |
| | | | 717/174 |
| 2013/0151594 A1* | 6/2013 | Fernandez-Ruiz | H04L 67/42 |
| | | | 709/203 |
| 2016/0094483 A1* | 3/2016 | Johnston | H04L 47/827 |
| | | | 709/226 |
| 2017/0262164 A1* | 9/2017 | Jain | G06F 3/0482 |
| 2018/0020045 A1* | 1/2018 | Cook | G06F 8/30 |

OTHER PUBLICATIONS

Radcliffe et al. "Multi-platform application deployment with UrbanCode Deploy". Feb. 18, 2014. IBM developerWorks. pp. 16.

Mell et al. National Institute of Standards and Technology. Special Publication 800-145. The NIST Definition of Cloud Computing. Gaithersberg, MD. Sep. 2011.

Appendix P List of IBM Patents and Applications Treated as Related. Two pages. Dated Nov. 1, 2017.

Hollands et al. Original U.S. Appl. No. 15/621,377, filed Jun. 13, 2017.

Hollands, CT/IB2018/054193 Application filed on Jun. 11, 2018.

PCT/IB2018/054193 International Search Report and Written Opinion. dated Oct. 12, 2018. Received Date: Oct. 23, 2018.

* cited by examiner

APPLICATION DEPLOYMENT ON A HOST PLATFORM BASED ON TEXT TAGS DESCRIPTIVE OF APPLICATION REQUIREMENTS

BACKGROUND

The present invention relates generally to application deployment, and more particularly to deploying an application in a distributed processing environment.

When deploying an application in a distributed processing environment (such as a cloud environment), an advantage from an application development perspective is that little or no consideration may be made by the application developer as to where the application is deployed. For instance, as long as the application can use the resource(s) it requires, the application will run on the platform it is deployed on. However, at a management level, the consideration as to which platform the application should be used to host the application can depend on many factors. Such factors may, for example, include: (i) the technical ability to host the application, e.g., whether or not the platform has the resources and/or functionality required to host the application; (ii) whether there are multiple platforms where an application may be hosted; and (iii) operating capacity of the platform(s).

Many considerations may therefore be important when it is decided how and where to deploy an application in a distributed processing environment and, as detailed above, an application developer may not know or be concerned about such considerations. Indeed, requiring an application developer to be fully aware of an application's needs and deployment consideration may place an undue burden on the developer and may require significant effort and resources to be consumed. Accordingly, it will be beneficial to provide assistance in the deployment of an application in a distributed processing environment and reduce an amount of human input and/or interaction that may otherwise be required.

SUMMARY

In one aspect, a computer program product for deploying an application in a distributed processing environment is provided. The computer program product comprises a computer readable storage medium having program code embodied therewith. The program code is executable to analyze an application so as to determine one or more requirements for executing the application; generate an application profile based on the one or more requirements, wherein the application profile is a representative of the one or more requirements for a platform of the distributed processing environment to host the application; and control deployment of the application on the platform of the distributed processing environment based on the application profile.

In another aspect, a computer system for deploying an application in a distributed processing environment is provided. The computer system comprises one or more processors, one or more computer readable tangible storage devices, and program instructions stored on at least one of the one or more computer readable tangible storage devices for execution by at least one of the one or more processors. The program instructions are executable to analyze an application so as to determine one or more requirements for executing the application. The program instructions are further executable to generate an application profile based on the one or more requirements, wherein the application profile is a representative of the one or more requirements for a platform of the distributed processing environment to host the application. The program instructions are further executable to control deployment of the application on the platform of the distributed processing environment based on the application profile.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, an application processing system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The present invention seeks to provide a method for deploying an application on suitable host platform of distributed processing environment offering a scalable service architecture (e.g. a cloud computing environment). The present invention further seeks to provide a computer program product including computer program code for implementing the method when executed on a processor of a processing system. The present invention yet further seeks to provide a processing system adapted to execute this computer program code.

According to an embodiment of the present invention there is provided a computer-implemented method for deploying an application in a distributed processing environment. The method comprises analyzing an application so as to determine one or more requirements for executing the application. An application profile is generated based on the one or more requirements, the application profile being representative of one or more requirements for a platform to host the application. The method further comprises controlling deployment of the application on a host platform of the distributed processing environment based on the application profile.

Proposed is a concept of analyzing an application to generate a profile of its requirements. The profile may then be assessed against characteristics and/or properties of a deployment environment or platform to determine if the environment or platform is suitable for hosting the application. In this way, an application developer may simply deploy an application to a cloud environment, wherein the application will then be analyzed to identify requirements or implementation constraints of the application without input from the application developer. Such identified requirements or constraints placed on a host platform by the application may profile the application, and this profile may then be used to determine the most appropriate or suitable hosting environment or platform for the application.

The proposed concept(s) may be undertaken automatically (e.g. in a fully automated manner) within the distributed processing environment. Thus, within a distributed processing environment (such as a cloud deployment environment for example), there may be provided a system for profiling requirements of an application and then determining where it is most appropriate to host the application (based on the profile of requirements of the application). This may provide the benefit that an application developer may not need to fully understand the requirements of their application, and may therefore avoid any need for the developer to build or provision an environment to suit the application. Further, embodiments may avoid a need for human intervention when deploying an application, thereby enabling real-time deployment of an application on the most appropriate platform while meeting the need of the application and without human involvement. By way of example, an application developer seeking to deploy an application to a cloud hosting environment, may, with little effort, choose to upload their application to the cloud, and from there the application will then be deployed according to proposed embodiments.

Thus, embodiments may provide an approach to determining an optimal environment for deployment of an application within a distributed processing environment (such as a cloud environment). Such an approach may employ an application profile which represents requirement or constraints that the application places on a host platform. The profile may be analyzed in conjunction with characteristics and/or properties of available host platforms so as to determine which, if any, of the available host platforms may be suitable for hosting the application.

For instance, a cloud services provider (whether public or private cloud) may have multiple platforms on which applications may be hosted. These platforms may vary in architecture of hardware, operating system and software/middleware stacks. By analyzing an application and determining requirements of the applications, embodiments may generate an application profile which may then be used to select (or even provision) a platform to host the application and then deploy the application to the selected platform. There may be various technical, business and/or cost reasons for choosing between available platforms, and embodiments may take these into account when selecting a host based on the application profile.

In an embodiment, the step of controlling deployment of the application may comprise analyzing the application profile and one or more properties of the host platform to determine if the host platform of the distributed processing environment may host the application. In this way, it may be determined whether or not a particular host platform is capable of hosting the application. Deployment of the application may then be controlled based on the outcome the determination. For example, if it is determined that the host platform of the distributed processing environment may host the application, an embodiment may further comprise the step of deploying the application on the host platform. Conversely, if is determined that the host platform of the distributed processing environment may not host the application, an embodiment may further comprise the step of not deploying the application on the host platform. Deployment of the application to a host platform that does not meet the requirement(s) and/or constraint(s) that would be placed on it by the application may therefore be avoided by proposed embodiments. Embodiments may therefore be adapted to only deploy the application to a host platform that is capable (e.g. has the appropriate resource(s), capabilities or capacity) of hosting the application.

Embodiments may further comprise the step of configuring one or more properties of the host platform based on the application profile. For instance, where its identified that a host platform may be capable of hosting the application subject to a property being changed, modified or otherwise reconfigured, embodiment may adapt the property of the host platform so as to enable the host platform to cater for deployment of the application. Thus, embodiments may help to ensure that an application is deployed on a host platform that is appropriately configured for successful execution of the application. This may, for example, alleviate a need for a developer or administrator to configured the host platform, thus reducing a need for human intervention.

The distributed processing environment may comprise first and second host platforms. The step of controlling deployment of the application may then comprise: analyzing the application profile and one or more properties of the each of the first and second host platforms to determine first and second indicators of hosting suitability for the first and second platforms, respectively; and deploying the application on one of the first and second host platforms based on the first and second indicators of hosting suitability. Such embodiments may therefore identify the most appropriate host platform for application deployment from a plurality of available host platforms. For instance, the most 'technically-suitable' host platform may be selected from a range of platforms provided by a distributed processing environment. This selection may take account of various factors, including business or costs constraints, when determining an indicator of hosting suitability. In this way, embodiments may dynamically and/or flexibly adapted to various technical and non-technical considerations when determining which host platform to employ for application deployment. Improved flexibility and/or accuracy in selecting a host platform may therefore be provided by proposed embodiments.

In an embodiment, the step of analyzing may comprise: analyzing at least one of: source code of the application: application logic of the application; a component or resource of the application; status changes of the application; and input/output data flows of the application. For example, an embodiment may analyze source code of the application to determine if the application uses a particular library and/or if the application requires a hosting environment be configured in a specific way. Such identified requirements may then be used to 'profile' the application for the purpose of assessment against one or more available hosting platforms.

By way of further example, the step of analyzing may comprise determining at least one of: a programming language of the application; a class library used by the application; an application/middleware requirement; a data access configuration; a security consideration; a runtime server employed by the application; a database employed by the application; a message system employed by the application; and an operating system employed by the application. For instance, the application may be analyzed to identify if the application uses a library that is part of the Java™ Enterprise Edition (JEE) specification. Upon identification of such a used, a requirement may be flagged that indicates a JEE server is required. It may also imply what particular feature needs to be supported. In another example, platform configuration requirements may be determined. For example, it may be determined that the application enforces HTTP or networking request that require a platform to be configured for HTTP load balancing, etc. In yet another example, an application/middleware requirement may be identified, which may include identifying that a particular application server is required to host the application and/or that a certain messaging framework is required. In another example, analysis of the application may determine a data access configuration is required which necessitates access to any, or a specific, database/file system. By way of yet another example, embodiments may determine one or more security considerations, such as a need for a particular authentication mechanism, transport layer security and/or security role structure.

By way of example, the generated application profile may comprise a tag that is indicative of a requirement for a platform to host the application. Embodiments may thus employ one or more simple identifiers that may be associated with an application. Such an identifier may, for example, comprise a simple 'hashtag' or other similar text-based identifier for representing a requirement of the application.

Further, the host platform may be associated with one or more tags describing one or more properties of the host platform. The step of controlling deployment of the application may then comprise comparing the tag of the application profile with the one or more tags associated with the host platform to determine if the host platform of the distributed processing environment may host the application. Simple text-string identification and comparison may thus be used to assess application requirements against host platform properties. Embodiments may therefore avoid a need for complex and/or computationally-expensive algorithms when assessing whether a host platform meets the requirement(s) of an application.

In an exemplary embodiment, the application may be adapted to implement a service in a cloud environment. By way of further example, the application may be adapted to implement a part of a micro-service-oriented architecture.

According to another embodiment of the present invention, there is provided a computer program product for deploying an application in a distributed processing environment. The computer program product comprises a computer readable storage medium having program instructions embodied therewith. The program instructions are executable by a processing unit to cause the processing unit to perform a method comprising: analyzing an application so as to determine one or more requirements for executing the application; generating an application profile based on the one or more requirements, the application profile being representative of one or more requirements for a platform to host the application; and controlling deployment of the application on a host platform of the distributed processing environment based on the application profile.

According to yet another aspect, there is provided an application processing system comprising at least one processor and the computer program product according to one or more embodiments. The at least one processor is adapted to execute the computer program code of said computer program product.

According to yet another aspect, there is provided a system for deploying an application in a distributed processing environment. The system comprises an analysis component adapted to analyze an application so as to determine one or more requirements for executing the application. The system also comprises a profile component adapted to generate an application profile based on the one or more requirements, the application profile being representative of one or more requirements for a platform to host the application. The system also comprises a deployment controller adapted to control deployment of the application on a host platform of the distributed processing environment based on the application profile.

The system may be adapted to implement a part of an off-premise platform, such as a cloud-based system or server.

Thus, there may be proposed a system which evaluates an application and determines requirements it places on a platform of successful execution/implementation. The requirements may be represented in a profile associated with the application, for example in the form of tags or identifiers, and deployment of the application on a host platform may then be controlled (e.g. accepted, denied and/or configured) based on the profile. For instance, the profile may be analyzed in conjunction with properties of a host platform to determine if the host platform is suitable for hosting the application. Based on the result of this determination, the host platform may be configured (or re-configured) and the application then deployed on the host platform. This may avoid a developer and/or administrator needing to have any knowledge and/or input on the deployment of an application on a host platform of a distributed processing environment.

Proposed are concepts for determining the hosting or deployment requirement(s) of an application (e.g. by analyzing aspects of the application such as its source code, logic flow, input/output data flows, resource calls/requests, etc.) and then assessing the requirement(s) against properties of one or more available hosting platforms so as to identify which of the hosting platforms are suitable for hosting the application. Thus, embodiments may implement a concept of 'profiling' hosting or deployment requirements of an application, and then using an obtained profile to determine suitability of a platform or environment for hosting the application. Embodiments may therefore be particularly for use in conjunction with a cloud computing environment that is capable of providing many hosting platforms or environments with differing characteristics and/or capabilities.

By way of example, a proposed concept may analyze an application to identify a programming language of the application, a class library used by the application; a runtime server employed by the application; and/or an operating system employed by the application. Identification of such aspects of an application my enable determination of hosting or deployment requirements of the application. In other words, the application may be analyzed to identify indicators of hosting/deployment requirements. Determined requirements of the application may then be represented in an application profile, e.g. using tags or identifiers that are descriptive of the requirements, and based on such a profile it may be determined whether or not the application may be deployed on an available platform. Such a concept may be implemented as a software tool, thus facilitating the identification of a suitable hosting platform within a cloud computing environment.

By interrogating application source code using automated software tooling focused on indicators of hosting requirements, constraints or requirements that may be placed on a hosting platform may be identified and represented in a profile of the application. By analyzing such a profile against a hosting platform (e.g. by automated comparison of the content of the profile with a description of the hosting platforms properties, capabilities or characteristics), suitability of the hosting platform for deploying the application may be assessed without human involvement.

For example, if one considers a scenario wherein a distributed processing environment has the following three potential platforms, each with different capabilities represented by tags prefixed with the character "#" (otherwise known as 'hashtags'):

(a) Platform A: z/OS®+CICS® (Java™ EE Liberty server, DB2®)—supported tags: #cics, #cobol, #c, #assembler, #pli, #java, #jee, #db2;

(b) Platform B: z/OS®+CICS® (Traditional languages, DB2®)—supported tags: #cics, #cobol, #c, #assembler, #pli, #db2; and (c) Platform C: z/OS®+Java™ EE Liberty server—supported tags: #java, #jee, A developer may have an application he/she wishes to deploy in the distributed processing environment.

According to a proposed embodiment, the deployment process may be summarized as follows:

(i) The application developer deploys the application "App1";

(ii) A deployment server (adapted to implement an embodiment of the invention) receives the application source code and initiates a scan of the source code. The scan may then determine the following: (a) the application code is written in Java™ (tag #java); and (b) the application uses the "javax.ws.rs.*" class libraries (as determined by the import statement in code), which requires a Java™ EE server runtime (tag #jee); and (c) the application uses the "com.ibm.cics.server.*" class libraries (tag #cics);

(iii) Upon completion of the application code scan, three tags descriptive of the three identified indicators or requirements are generated as a profile for the application, namely "#java", "#jee" and "#cics";

(iv) The tags of the profile are analyzed (e.g. compared) against the supported tags of the three available platforms to determine if any of the platforms is able to support all three of the identified requirements of the application. In this exemplary instance, a comparison of the tags results in the determination that Platform A is the only platform able to host all three requirements;

(v) Based on the result of step (iv), the deployment server controls deployment of the application to the suitable platform (which in this exemplary instance is Platform A).

Illustrative embodiments may therefore provide a tool that helps identify candidate platforms for hosting an application. It may do this by analyzing the application to generate a profile representing hosting requirement of the application and then comparing the profile with properties of available platforms. Proposed concepts may thus provide hosting requirement information that can be used to decide which platforms, if any, are suitable for hosting a specific application. Dynamic distributed application deployment may therefore be provided by proposed embodiments.

Many different ways to identify hosting requirements or constraints of an application may be employed by embodiments, and these may be implemented in isolation or in combination. Modifications and additional steps to a traditional (application) processing systems may also be proposed which may enhance the value and utility of the proposed concepts.

Illustrative embodiments may be utilized in many different types of application processing environments. Illustrative embodiments may, for example, be employed in relation to stateless and scalable cloud-based applications for data and/or event processing.

In order to provide a context for the description of elements and functionality of the illustrative embodiments, the figures are provided hereafter as an example environment in which aspects of the illustrative embodiments may be implemented. It should be appreciated that the figures are only exemplary and not intended to assert or imply any limitation with regard to the environments in which aspects or embodiments of the present invention may be implemented. Many modifications to the depicted environments may be made without departing from the spirit and scope of the present invention.

Also, those of ordinary skill in the art will appreciate that the hardware and/or architectures in the Figures may vary depending on the implementation. Further, the processes of the illustrative embodiments may be applied to multiprocessor/server systems, other than those illustrated, without departing from the scope of the proposed concepts.

Moreover, the system may take the form of any of a number of different processing devices including client computing devices, server computing devices, a tablet computer, laptop computer, telephone or other communication devices, personal digital assistants (PDAs), or the like. Thus, the system may essentially be any known or later-developed processing system without architectural limitation.

A proposed concept may enhance a cloud-based service provisioning system by reducing developer and/or administrator involvement or application deployment more efficient. Embodiments may enable application to be analyzed and deployed on appropriate hosting platforms. Such proposals can extend or improve the processing capabilities or efficiency of a cloud-based software delivery system.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
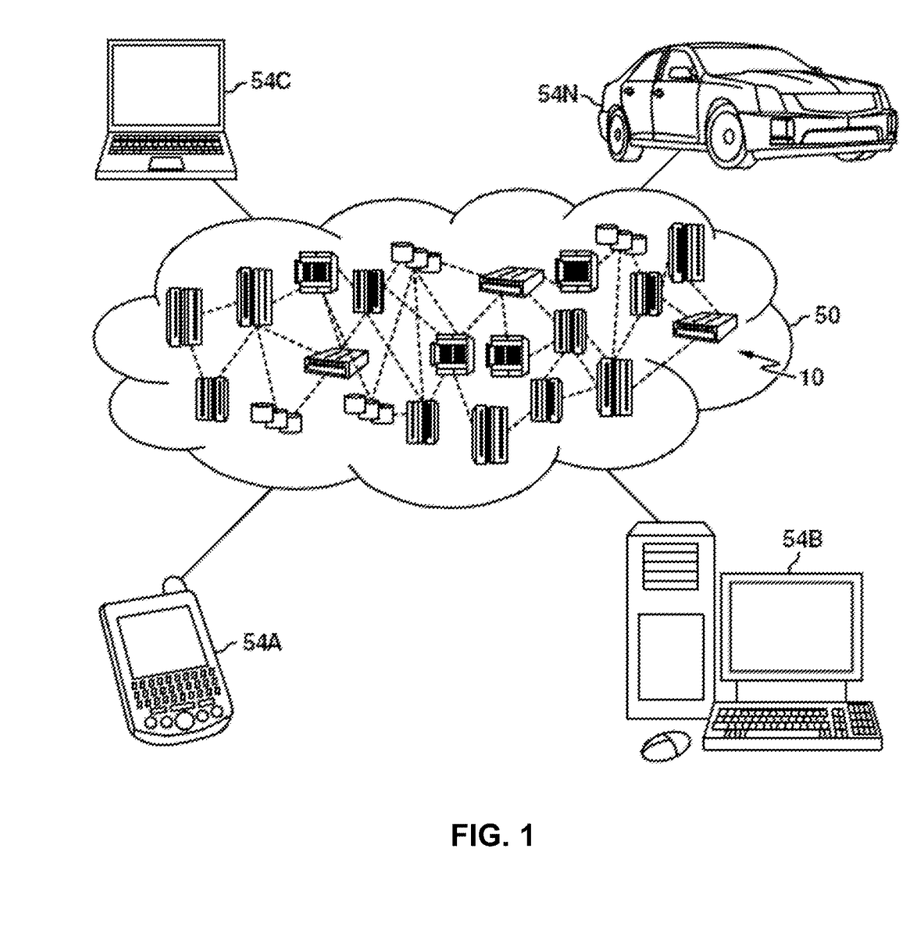
FIG. 1 depicts a cloud computing environment, in accordance with an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
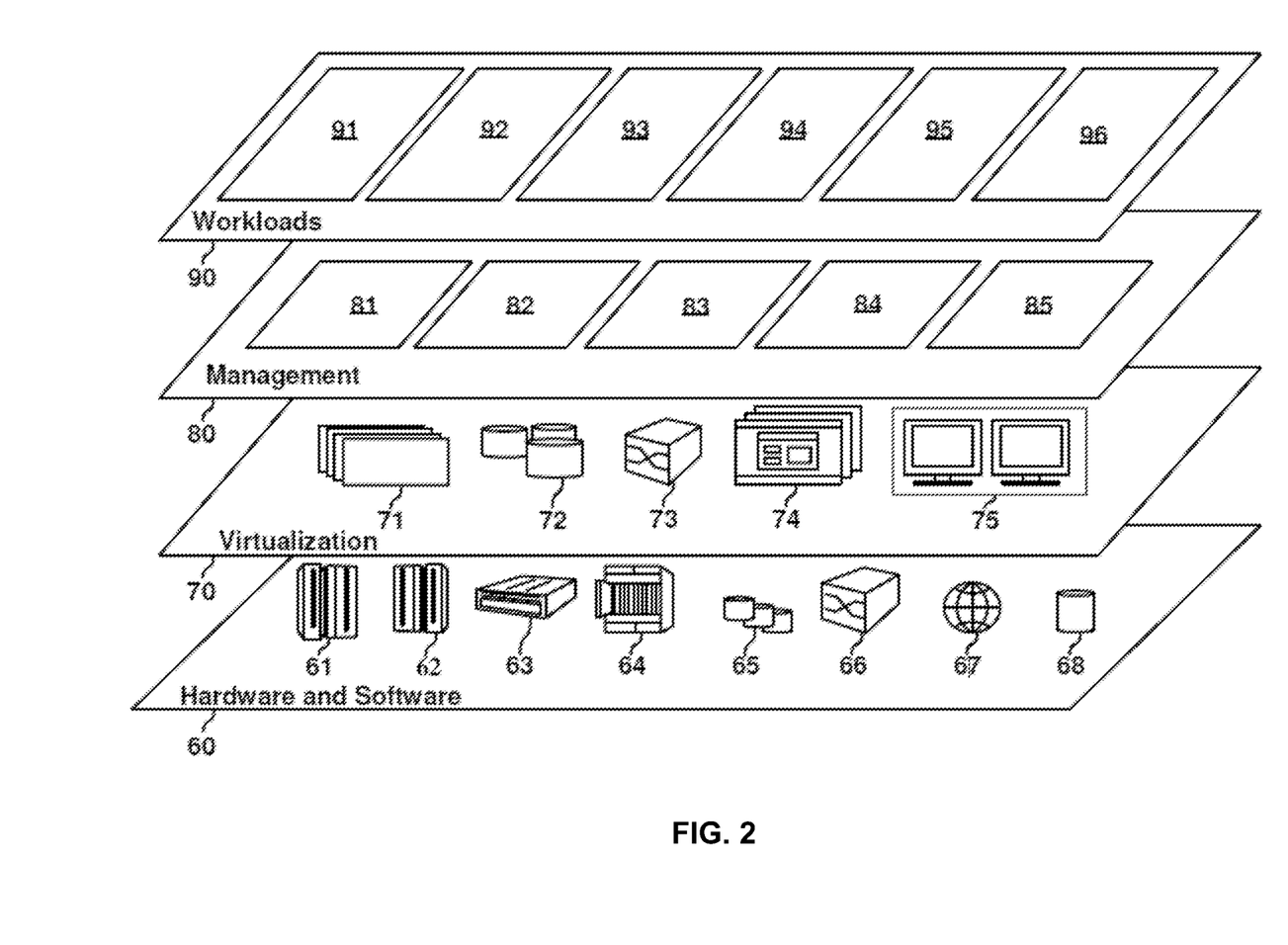
FIG. 2 depicts abstraction model layers, in accordance with an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Application deployment 85 provides application deployment according to proposed embodiments.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

A proposed concept may enhance an application deployment system by reducing developer involvement while maximizing quality of service. Embodiments may also enable flexibility to provide more efficient deployment of applications. Such proposals can extend or improve the deployment capabilities or efficiency of an intelligent Platform as a Service (PaaS) system or component.

Figure 3:
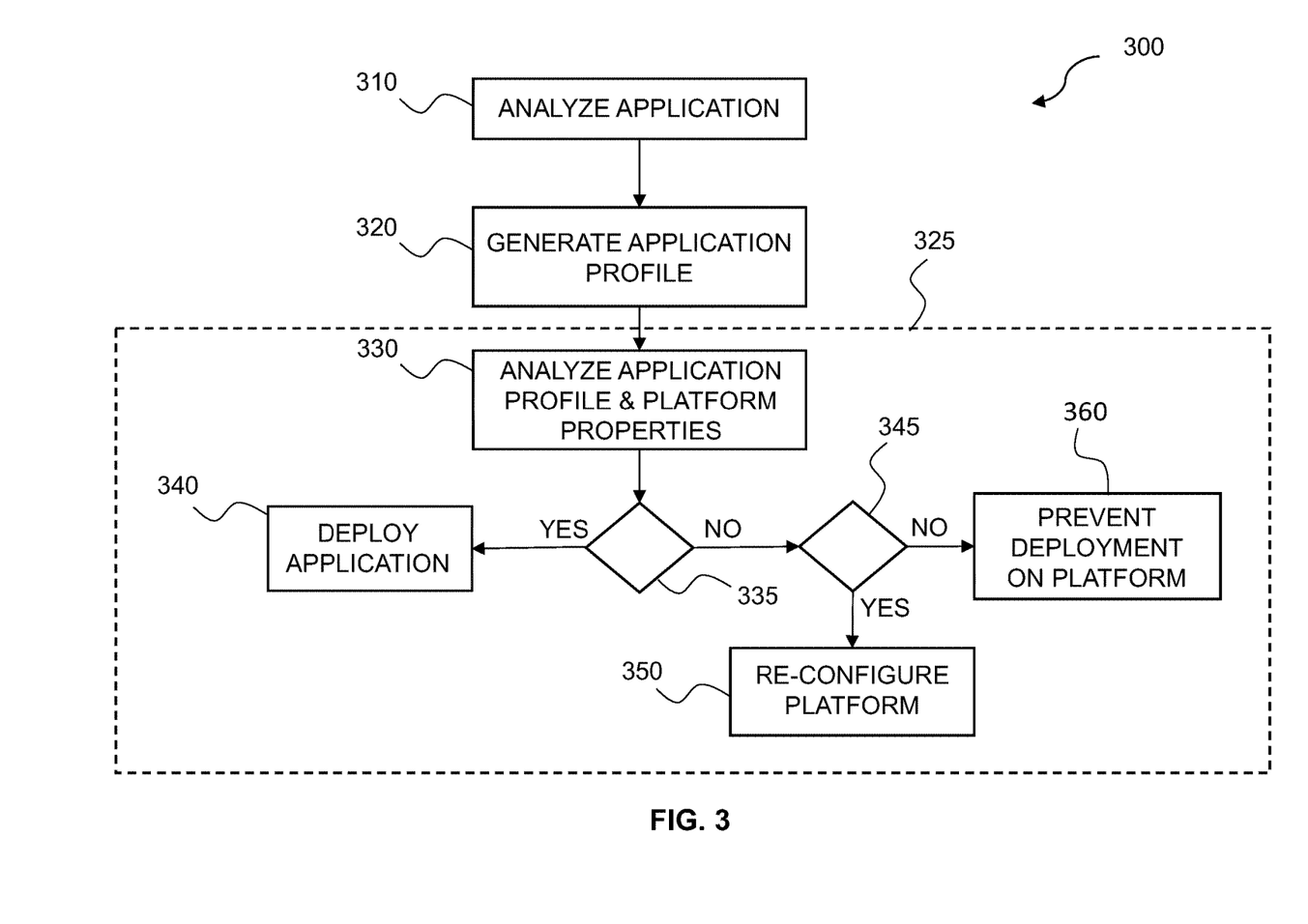
FIG. 3 is a simplified flow diagram of a method for deploying an application in a distributed processing environment, in accordance with an embodiment of the present invention.

FIG. 3 is a simplified flow diagram of method 300 for deploying an application in a distributed processing environment, in accordance with an embodiment of the present invention. In particular, for this example, the application may be an application that is adapted to implement a service in a cloud environment and, more specifically, may be adapted to implement a part of a micro-service-oriented architecture.

At step 310, a computer analyzes the application so as to determine one or more requirements for executing the application. The process of analyzing the application may comprise analyzing the source code of the application, application logic of the application, a component or resource of the application, status changes of the application, and/or input/output data flows of the application. In particular, such analysis may aim to determine indicators of one or more constraints or requirements of the application, such as a programming language of the application, a class library used by the application, a runtime server employed by the application, and/or an operating system employed by the application.

At step 320, the computer generates an application profile, based on the requirements identified at step 310. For example, the application profile is generated from the identified requirements of the application so that it is representative of the requirements for a platform to host the application. The step 310 of generating the application profile further comprises generating, for each identified requirement, a tag or text-based descriptor that is indicative of the requirement. Such a tag may comprise a simple text-string prefixed with an identifier of the tag (e.g., a hash character or "#"), wherein the text-string provides a simplified description or summary of the requirement. By way of example, in response to identifying (e.g., at step 310) that an application requires the use of a Java™ server, at step 320, the computer may generate the tag "#java" to indicate this requirement.

At steps 325, the computer controls deployment of the application on a host platform of the distributed processing environment, based on the generated application profile. As illustrated in FIG. 3, steps 325 of controlling deployment of the application comprises multiple steps. The multiple steps include steps 330-360. At step 330, the computer analyzes the application profile and properties of the host platform of the distributed processing environment to determine whether the host platform may host the application. In particular, by way of example only, the host platform is associated with tags describing the properties of the host platform. These tags may be in the same form as those of the application profile, namely simple text-strings prefixed with an identifier of the tag (e.g., a hash character or "#"), wherein the text-string provides a simplified description or summary of a property of the host platform. The analysis in method 300 may therefore simply comprise the process of comparing the tag(s) of the application profile with the tag(s) associated with the host platform to determine whether the host platform of the distributed processing environment may host the application. For example, if all tags of the application profile are supported by the host platform (e.g., if each tag of the application profile is found to have a matching tag amongst the tags associated with the host platform), the computer determines that the host platform can host the application.

At decision block 335, the computer assesses the determination made at step 330. In response to determining that the host platform may host the application because its properties meet the requirements of the application (YES branch of decision block 335), the computer at step 340 deploys the application on the host platform. In response to determining that the host platform may not host the application because its properties do not meet the requirements of the application (NO branch of decision block 335), the computer, decision block 345, the computer assesses whether or not the platform may be reconfigured so as to enable it to host the application.

In response to determining that the platform may be reconfigured so as to enable it to host the application (YES branch of decision block 345), at step 350, the computer configures (or re-configures) one or more properties of the host platform in accordance with the requirements indicated by the application profile. In response to determining that the platform may not be reconfigured so as to enable it to host the application (NO branch of decision block 345), at step 360, the computer prevents the deployment of the application on the platform.

Figure 4:
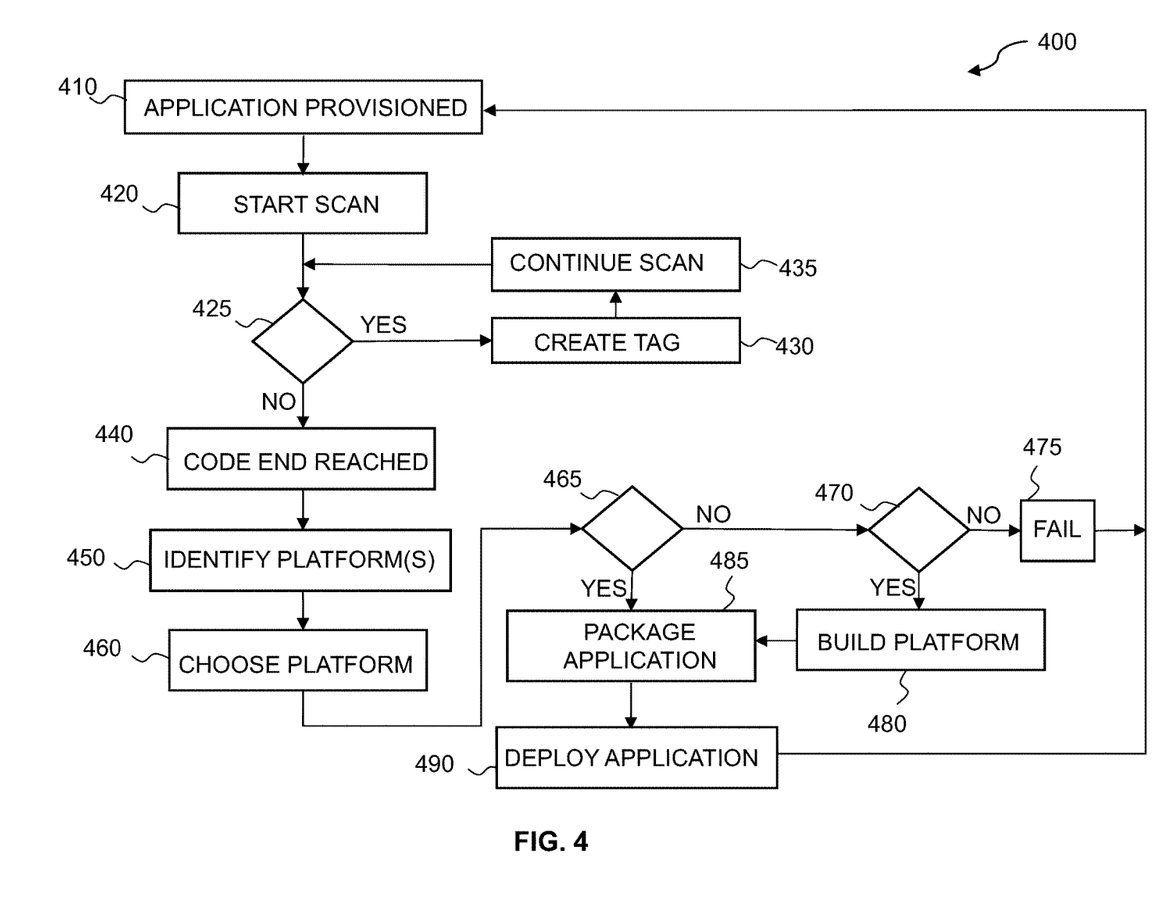
FIG. 4 is a flow diagram of an exemplary implementation of a method, in accordance with an embodiment of the present invention.

Let us now consider an exemplary scenario wherein an application developer chooses to deploy an application that has been developed. This scenario makes the basic assumptions that the developer has chosen the cloud service provider that the develop wants to use to host the application, installing any required software to physically transfer the application to the cloud. FIG. 4 is a flow diagram showing an exemplary implementation of method 400 for deploying an application, in accordance with an embodiment of the present invention.

Method 400 starts with step 410 of the provisioning the application, for example, either to a local client or a remotely-located cloud service provider. By way of example, it may be preferable for a local client to receive the application and implement (at least part of) the application if source code confidentiality requirements mean the source should not be transferred. Alternatively, it may be preferable to provide the application source code to a remotely-located cloud service provider (e.g., a cloud-based system) so as to take advantage of improved (e.g., increased) processing capabilities.

At step 420, a computer starts a source code scan. The types of information that a scan searches for may include, but is not limited to, a programming language the application code is written in, libraries used by the application (e.g., if the application uses a library that is part of the Java™ Enterprise Edition specification, a requirement would be flagged that either at a high level a JEE server is required, but might also imply what particular feature needs to be supported), platform configuration requirements (e.g., HTTP or networking requirements requiring a platform to be configured for HTTP load balancing etc.), application/middleware requirement (e.g., this may things such as a particular application server being required to host the application, and/or a particular messaging frameworks), data access configuration (e.g., access to any, or a specific, database or file system being required), and/or security considerations (e.g., particular authentication mechanisms, transport layer security, and/or security role structures being required). The list in this paragraph is not exhaustive, but is instead intended to demonstrate elements of the platform requirements that may be determined from the source code scan. For each requirement that is found at step 425, a computer executes step 430 wherein a tag descriptive of the requirement is generated and stored (e.g., in a profile associated with the application) and then executes step 435 wherein the source code scan continues.

When the source code scan is completed (i.e., when the code end is reached at step 440), the tags (requirements) identified in the source code scan are used at step 450 and compared to available platforms. These platforms may have been initially configured, may be discovered, or can register with the deployment server informing it of what requirements it can fulfil. The latter will require a defined standard that a platform can use to register.

Once the platform(s) that fit the requirements are found at step 450, if required, the best/optimal platform may be determined at step 460 based on the technical and/or business criteria. These considerations may have been previously supplied, and may be as simple as a priority ordered list.

Next, it is determined at step 465 whether the chosen platform is available. If the chosen platform is not available, it is determined, at step 470, whether the chosen platform may be built/provisioned. If the chosen platform may be built/provisioned, the platform is built/provisioned at step 480. Conversely, if the platform cannot be built/provisioned, failure to deploy the application is concluded at step 475 and this is reported back to the provisioning party of the application.

If the chosen platform is available (or has been built/provisioned at step 480), the application is built and packaged at step 485 according to the requirements of the platform, and then the application is deployed on the platform at step 490.

Successful completion along with any information about how to access the application may then be communicated back to the application developer.

From the above description, it will be appreciated that proposed embodiments may provide the benefit that a developer, not knowing or manually inputting any data on requirements of an application, may deploy the application to a cloud environment, wherein the application may then be deployed to a suitable host platform. In doing so, the application requirements may be profiled and then compared against properties and/or capabilities of available platforms so as to determine the most-appropriate platform on which to deploy the application. If the most-appropriate platform is not available, a suitable platform may be provisioned (for example, by reconfiguring an available platform) so as to meet the requirements of the application.

In some embodiments, there may be provided a system comprising a processing arrangement adapted to implement any processing method previously described with reference to FIG. 1 to FIG. 4.

Figure 5:
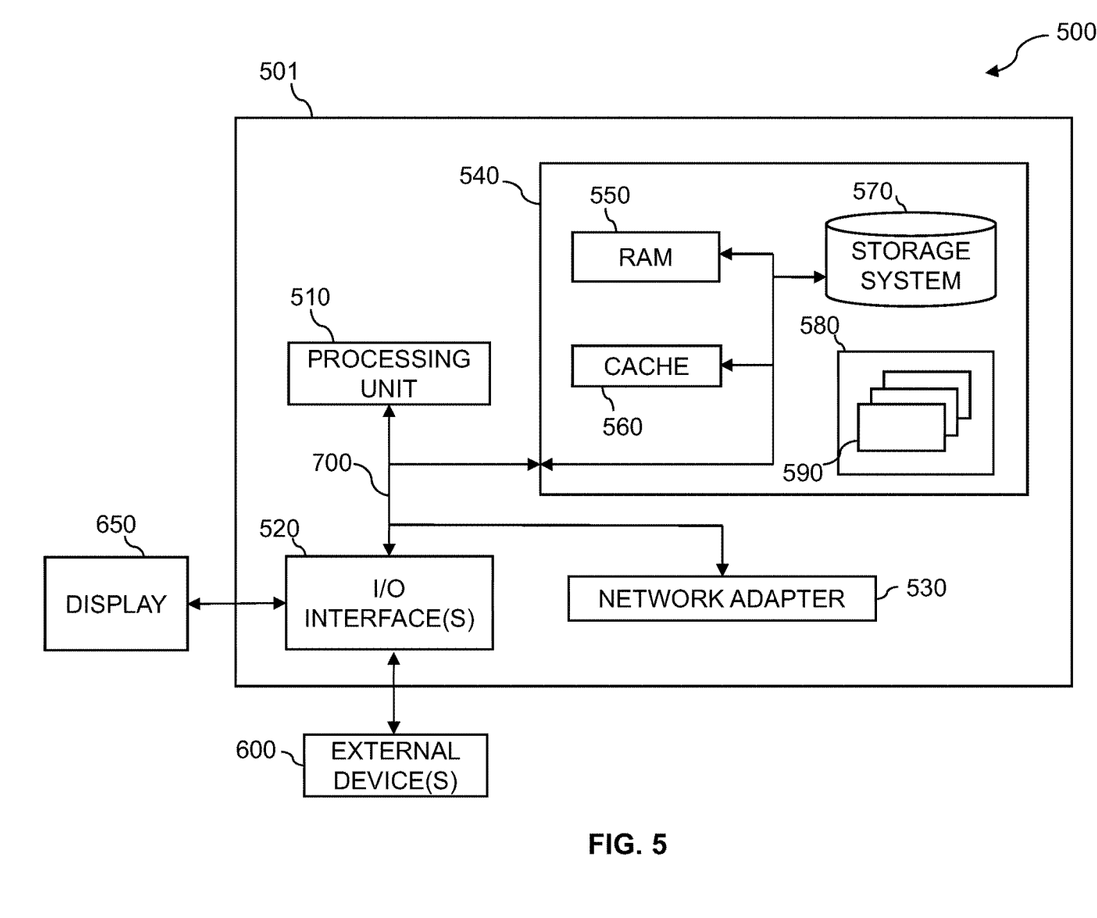
FIG. 5 illustrates a computer system/server, in accordance with an embodiment of the present invention.

By way of example, as illustrated in FIG. 5, embodiments may comprise a computer system/server 501, which may form part of a networked system 500. The components of computer system/server 501 may include, but are not limited to, one or more processing arrangements, for example comprising processors or processing units 510, system memory 540, and bus 700 that couples various system components including system memory 540 to processing unit 510.

Bus 700 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 501 typically includes a variety of computer system readable media. Such media may be any available media that is accessible by computer system/server 501, and it includes both volatile and non-volatile media, removable and non-removable media.

System memory 540 can include computer system readable media in the form of volatile memory, such as random access memory (RAM) 550 and/or cache memory 560. Computer system/server 501 may further include other removable/non-removable, volatile/non-volatile computer system storage media. By way of example only, storage system 570 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 700 by one or more data media interfaces. As will be further depicted and described below, memory 540 may include at least one program product having a set (e.g., at least one) of program modules that are configured to carry out the functions of embodiments of the invention.

Program/utility 580, having a set (at least one) of program modules 590, may be stored in memory 540 by way of example, and not limitation, as well as an operating system, one or more application programs, other program modules, and program data. Each of the operating system, one or more application programs, other program modules, and program data or some combination thereof, may include an implementation of a networking environment. Program modules 590 generally carry out the functions and/or methodologies of embodiments of the invention as described herein.

Computer system/server 501 may also communicate with one or more external devices 600 such as a keyboard, a pointing device, a display 650, etc.; one or more devices that enable a user to interact with computer system/server 501; and/or any devices (e.g., network card, modem, etc.) that enable computer system/server 501 to communicate with one or more other computing devices. Such communication can occur via Input/Output (I/O) interfaces 520. Still yet, computer system/server 501 can communicate with one or more networks such as a local area network (LAN), a general wide area network (WAN), and/or a public network (e.g., the Internet) via network adapter 530. As depicted, network adapter 530 communicates with the other components of computer system/server 501 via bus 700. It should be understood that although not shown, other hardware and/or software components could be used in conjunction with computer system/server 501. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for deploying an application in a distributed processing environment, the computer program product comprising a computer readable storage medium having program code embodied therewith, the program code executable to:
    analyze, by a deployment server, an application to determine one or more requirements for executing the application on a host platform of the distributed processing environment to host the application, by scanning source code of the application to obtain information of a programming language, libraries used by the application, host platform configuration requirements, application and middleware requirements, data access configurations, and security considerations;
    generate, by the deployment server, an application profile based on the one or more requirements, the application profile being representative of the one or more requirements, the profile comprising one or more tags of the application profile, the one or more tags of the application profile being one or more text based descriptors representing the one or more requirements, the one or more tags having one or more tag identifiers which are associated with the application, wherein a tag comprises a simple text-string prefixed with an identifier of the tag and the simple text-string provides a simplified description of the one or more requirements;
    compare, by the deployment server, the one or more tags of the application profile with one or more tags of the host platform, the one or more tags of the host platform being one or more text based descriptors describing one or more properties of the host platform;
    determine, by the deployment server, whether the one or more tags of the application profile match the one or more tags of the host platform;
    in response to determining that the one or more tags of the application profile match the one or more tags of the host platform, deploy, by the deployment server, the application on the host platform;
    in response to determining that the one or more tags of the application profile do not match the one or more tags of the host platform, reconfigure, by the deployment server, the one or more properties of the host platform, so as to enable the host platform to host the application; and
    in response to determining that the one or more tags of the application profile do not match the one or more tags of the host platform and in response to determine that the one or more properties of the host platform are not reconfigured, compare, by the deployment server, the one or more tags of the application profile with one or more tags of a second host platform, and determine, by the deployment server, whether the one or more tags of the application profile match the one or more tags of the second host platform.

2. The computer program product of claim 1, further comprising the program code executable to:
    configure, by the deployment server, the one or more properties of the host platform of the distributed processing environment, based on the application profile.

3. The computer program product of claim 1, further comprising the program code executable to:
    analyze, by the deployment server, the application profile and the one or more properties of each of a first host platform and the second host platform of the distributed processing environment;
    determine, by the deployment server, a first indicator and a second indicator of hosting suitability for the first host platform and second host platform, respectively; and
    deploy, by the deployment server, the application on one of the first host platform and second host platform, based on the first indicator and second indicator of the hosting suitability.

4. The computer program product of claim 1, further comprising the program code executable to analyze at least one of application logic of the application, a component or resource of the application, status changes of the application, and input/output data flows of the application.

5. The computer program product of claim 1, wherein the application is adapted to implement a service in a cloud environment.

6. The computer program product of claim 5, wherein the application is adapted to implement a part of a micro-service-oriented architecture.

7. The computer program product of claim 1, further comprising the program code executable to determine at least one of a runtime server employed by the application, a database employed by the application, a message system employed by the application, and an operating system employed by the application.

8. A computer system for deploying an application in a distributed processing environment, the computer system comprising:
    one or more processors, one or more computer readable tangible storage devices, and program instructions stored on at least one of the one or more computer readable tangible storage devices for execution by at least one of the one or more processors, the program instructions executable to:
    analyze, by a deployment server, an application to determine one or more requirements for executing the application on a host platform of the distributed processing environment to host the application, by scanning source code of the application to obtain information of a programming language, libraries used by the application, host platform configuration requirements, application and middleware requirements, data access configurations, and security considerations;
    generate, by the deployment server, an application profile based on the one or more requirements, the application profile being representative of the one or more requirements, the profile comprising one or more tags of the application profile, the one or more tags of the application profile being one or more text based descriptors representing the one or more requirements, the one or more tags having one or more tag identifiers which are associated with the application, wherein a tag comprises a simple text-string prefixed with an identifier of the tag and the simple text-string provides a simplified description of the one or more requirements;

compare, by the deployment server, the one or more tags of the application profile with one or more tags of the host platform, the one or more tags of the host platform being one or more text based descriptors describing one or more properties of the host platform;

determine, by the deployment server, whether the one or more tags of the application profile match the one or more tags of the host platform;

in response to determining that the one or more tags of the application profile match the one or more tags of the host platform, deploy, by the deployment server, the application on the host platform;

in response to determining that the one or more tags of the application profile do not match the one or more tags of the host platform, reconfigure, by the deployment server, the one or more properties of the host platform, so as to enable the host platform to host the application; and in response to determining that the one or more tags of the application profile do not match the one or more tags of the host platform and in response to determine that the one or more properties of the host platform are not reconfigured, compare, by the deployment server, the one or more tags of the application profile with one or more tags of a second host platform, and determine, by the deployment server, whether the one or more tags of the application profile match the one or more tags of the second host platform.

9. The computer system of claim 8, further comprising the program instructions executable to:

configure, by the deployment server, the one or more properties of the host platform of the distributed processing environment, based on the application profile.

10. The computer system of claim 8, further comprising the program instructions executable to:

analyze, by the deployment server, the application profile and the one or more properties of each of a first host platform and the second host platform of the distributed processing environment;

determine, by the deployment server, a first indicator and a second indicator of hosting suitability for the first host platform and second host platform, respectively; and deploy, by the deployment server, the application on one of the first host platform and second host platform, based on the first indicator and second indicator of the hosting suitability.

11. The computer system of claim 8, further comprising the program instructions executable to analyze at least one of application logic of the application, a component or resource of the application, status changes of the application, and input/output data flows of the application.

12. The computer system of claim 8, wherein the application is adapted to implement a service in a cloud environment.

13. The computer system of claim 12, wherein the application is adapted to implement a part of a micro-service-oriented architecture.

14. The computer system of claim 8, further comprising the program instructions executable to determine at least one of a runtime server employed by the application, a database employed by the application, a message system employed by the application, and an operating system employed by the application.

* * * * *